(12) United States Patent
Patel

(10) Patent No.: US 8,442,881 B2
(45) Date of Patent: May 14, 2013

(54) SYSTEMS AND METHODS OF PROCESSING AND CLASSIFYING A FINANCIAL TRANSACTION

(75) Inventor: Samir Kiritkumar Patel, Arlington, TX (US)

(73) Assignee: Aashirvad Holdings LLC, Arlington, TX (US)

( * ) Notice: Subject to any disclaimer, the term of this patent is extended or adjusted under 35 U.S.C. 154(b) by 107 days.

(21) Appl. No.: 12/860,794

(22) Filed: Aug. 20, 2010

(65) Prior Publication Data

US 2012/0047052 A1    Feb. 23, 2012

(51) Int. Cl.
*G07B 17/00*    (2006.01)
*G06Q 40/00*    (2012.01)

(52) U.S. Cl.
USPC .............................................. 705/30; 705/35

(58) Field of Classification Search ........................ None
See application file for complete search history.

(56) References Cited

U.S. PATENT DOCUMENTS

| | | | |
|---|---|---|---|
| 4,264,808 A | 4/1981 | Owens et al. | |
| 5,390,113 A | 2/1995 | Sampson | |
| 5,631,984 A | 5/1997 | Graf et al. | |
| 5,708,810 A | 1/1998 | Kern et al. | |
| 5,875,435 A | 2/1999 | Brown | |
| 7,379,906 B2 | 5/2008 | Schellmann | |
| 7,392,934 B2 * | 7/2008 | Hahn-Carlson et al. | 235/379 |
| 7,574,386 B2 * | 8/2009 | Hahn-Carlson et al. | 705/30 |
| 7,822,653 B2 * | 10/2010 | Hahn-Carlson et al. | 705/30 |
| 2002/0046058 A1 | 4/2002 | Brown | |
| 2002/0107794 A1 * | 8/2002 | Furphy et al. | 705/40 |
| 2002/0111903 A1 | 8/2002 | Nilsson | |
| 2004/0148233 A1 | 7/2004 | Lee | |
| 2004/0260636 A1 | 12/2004 | Marceau et al. | |
| 2005/0274792 A1 * | 12/2005 | Hahn-Carlson et al. | 235/379 |
| 2005/0278221 A1 * | 12/2005 | Hahn-Carlson et al. | 705/16 |
| 2005/0289023 A1 * | 12/2005 | Hahn-Carlson et al. | 705/30 |
| 2005/0289024 A1 * | 12/2005 | Hahn-Carlson et al. | 705/30 |
| 2006/0190397 A1 | 8/2006 | Lindemann et al. | |
| 2006/0268352 A1 | 11/2006 | Tanigawa et al. | |
| 2007/0156505 A1 | 7/2007 | Agassi et al. | |
| 2007/0271160 A1 | 11/2007 | Stone et al. | |
| 2008/0249940 A1 * | 10/2008 | Hahn-Carlson et al. | 705/44 |
| 2009/0172035 A1 * | 7/2009 | Lessing et al. | 707/104.1 |
| 2009/0292631 A1 | 11/2009 | Wells et al. | |

OTHER PUBLICATIONS

Leslie Capachietti. 2010. QuickBooks Financial Software 2010. Available: www.quickbooks.intuit.com.

* cited by examiner

*Primary Examiner* — Mussa A Shaawat
(74) *Attorney, Agent, or Firm* — Afghani Law Firm; Kevin Afghani

(57) ABSTRACT

The present disclosure generally provides systems and methods of classifying financial transactions. In one embodiment, the present disclosure may generally include a system of classifying financial transactions. The system may include a processor coupled to a database. The processor may be programmed to receive transaction information and a source document associated with a financial transaction. The transaction information and source data associated with the source document may be stored in the database. The stored transaction information and the source data may be retrieved from the database and may form a basis for a determination of a code associated with the financial transaction.

20 Claims, 6 Drawing Sheets

SYSTEMS AND METHODS OF PROCESSING AND CLASSIFYING A FINANCIAL TRANSACTION

TECHNICAL FIELD

The present disclosure generally relates to information systems and, in particular, to systems and methods of classifying financial transactions, managing bookkeeping, and business accounting.

BACKGROUND

Conventional bookkeeping and accounting systems typically do not provide an integrated system for data entry, business transaction processing, check-writing, and automatic general ledger coding. A bookkeeper or accountant typically manually enters information such as, for example, the vendor or service provider name, invoice, check number, amount, date, and check memo into a conventional accounting system. Then, the bookkeeper or accountant needs to decide what general ledger codes to properly code and account for the check. Accordingly, the small business owner or bookkeeper may be required to have some accounting knowledge and familiarity with general ledger codes before handing over the business accounting books to a certified public accountant (CPA). Otherwise, the CPA may be required to review each and every entry.

What is needed is a system and method for business owners, small business owners, individuals, and the like to independently, efficiently, and cost effectively provide business transaction processing and automatic general ledger coding and management systems.

SUMMARY

Embodiments of the present disclosure generally provide systems and methods of classifying financial transactions.

In one embodiment, the present disclosure may generally include a system of classifying financial transactions. The system may include a processor coupled to a database. The processor may be programmed to receive transaction information and a source document associated with a financial transaction. The transaction information and source data associated with the source document may be stored in the database. The stored transaction information and the source data may be retrieved from the database and may form a basis for a determination of a code associated with the financial transaction.

In one embodiment, the present disclosure may generally include a method of managing bookkeeping data. The method may include parsing bookkeeping data from a transaction document. The method may also include correlating the parsed bookkeeping data with historical data associated with the parsed bookkeeping data using a processor. The method may further include outputting a prioritized list of general ledger codes associated with the transaction document using the correlated data. The method may also include selecting a desired general ledger code from the prioritized list and updating a database of the historical data based on the selection of the desired general ledger code.

In one embodiment, the present disclosure may generally include a method of managing bookkeeping data. The method may include using optical character recognition technology to extract bookkeeping data from a transaction document. The method may also include using a processor to correlate the extracted bookkeeping data stored with historical data from a database associated with the extracted bookkeeping data using a processor to output a prioritized list of general ledger codes associated with the transaction document over an Internet-enabled network. The method may also include selecting a desired general ledger code from the prioritized list and updating a database of the historical data based on the selection of the desired general ledger code.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Embodiments of the present disclosure generally include systems of providing an integrated online bookkeeping system using open source software and standards. In one embodiment, while entering information into a business transaction processing module, the business owner, bookkeeper, accountant, or other authorized person may upload images of receipts, invoices, purchasing orders, etc. and tag such documents with a particular data entry. Accordingly, each entry may be associated with multiple documents supporting the entry, thus eliminating the need to save/store the hard copy documents in a physical file for use by the bookkeeper when reviewing such data entries. The "files" may be stored and associated with a cloud thus enabling access of information from anywhere using a web-enabled device.

Embodiments of the present disclosure may also provide a check-writing module that may print checks using any suitable paper, thus eliminating the need to purchase and store pre-printed form checks. Accordingly, a small business owner may manage a business without having to worry about ledger entries for debits and credits. Furthermore, the owner's certified public accountant may be more productive and efficient because source documents for and information for each entry is available online in one location.

The present disclosure may also generally provide the ability for an accountant to review all inputted information, including any documents associated with a particular entry, and the suggested general ledger code for each entry. The reviewing accountant may then accept or change the suggested general ledger code as appropriate. Embodiments of the present disclosure may be used to automatically generate and dynamically "learn" general ledger codes associated with business transactions and historical data entered in, generated by, or associated with system 100 according to one embodiment of the present disclosure. Information from the system may be stored (via the Internet, intranet, or other network) and securely accessed by a certified public accountant or other professional to easily review, process, and classify the business transaction data cost-effectively and efficiently.

Figure 1:
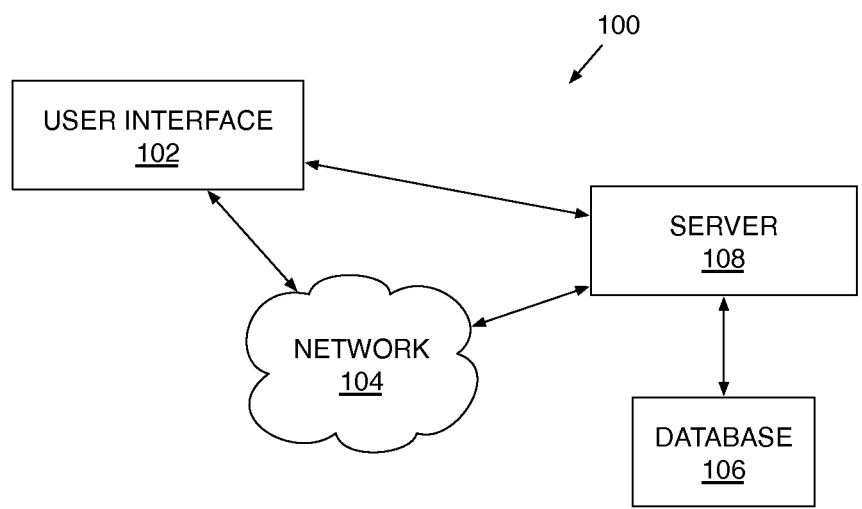
FIG. 1 is a simplified illustration of an exemplary business accounting and transactions system according to one embodiment of the present disclosure.

FIG. 1 is a simplified illustration of business accounting and transactions system 100 according to one embodiment of the present disclosure. It should be understood that system 100 shown in FIG. 1 is for illustrative purposes only and that any other suitable system or subsystem may be used in conjunction with or in lieu of system 100 or its subsystems according to one embodiment of the present disclosure.

In one embodiment, system 100 may print checks, record and categorize each check, record and categorize invoices, and assign appropriate general ledger codes for business transactions over an open source platform, thus providing an integrated system of bookkeeping that may be easily reviewed and finalized cost-effectively and efficiently from any web-enabled device.

System 100 may generally provide a rich Internet application (RIA) and integrated online bookkeeping system having user interface 102, network 104, database 106, and server 108 according to one embodiment of the present disclosure. It should be understood that system 100 and parts of system 100 may include an Internet-based service or network of shared resources, software, and information that may be provided that are allocated on demand as required (i.e., cloud computing systems, networks, and resources).

In one embodiment, system 100 may include RIA software that is compliant with open source standards to facilitate full integration and enable compatibility with, for example, any proprietary software and suitable user interface 102. System 100 may include a software application compliant with open source standards such as, for example, extendible markup language (XML), hyper text markup language (HTML), and cascading style sheets (CSS) while using open source software such as, for example, object oriented program (OOP) language, PHP, jQUERY, or MySQL.

In one embodiment, HTML may be used create the basic structure of user interface 102 (or a webpage associated with user interface 102), while CSS may be used to add styles, color, or fonts to user interface 102. Although system 100 is described as having an open source platform, it should be understood that system 100 may include any suitable software such as, for example, any proprietary software from any number of vendors.

In one embodiment, system 100 may include model-view-controller architectural software patterns that may essentially split up the software and data into groups such as, for example, a model group, a view group, and a controller group. The model group may include a software representation of the data (i.e., splitting the data structure), while the view group may include a method of displaying the model group (i.e., using different display modes). The controller group may essentially retrieve, save, and manipulate the model group.

System 100 may also include JavaScript programming to further develop the RIA and include a rich user interface and implement asynchronous JavaScript and XML (AJAX). In one embodiment, AJAX may include several different web techniques to create highly intuitive and interactive web applications such as those used in system 100. For example, AJAX and XML may be used to allow different sections of a webpage to request and retrieve data from system 100 or server 108 independently and without having to refresh the entire webpage. It should be understood that system 100 may use a variety of languages, technologies, and methodologies to create a highly intuitive and low maintenance system from both a development and user perspective according to one embodiment of the present disclosure.

User interface 102 may be accessed by an authorized person, a group of people, an employee, a group of employees, a system, a certain security level, or an authorized network of systems to input, view, correlate, analyze, and report information collected by system 100 according to one embodiment of the present disclosure. In one embodiment, user interface 102 may include a user terminal, website, stand-alone unit, web-enabled device, network device, computer, machine, wireless device, telephone system, smart phone, cellular modem, Internet portal, Intranet portal, remote access portal, hand-held unit, other suitable device or terminal, or any combination thereof. The user interface 102 may communicate directly with the server 108 or it may communicate with the server 108 through the network 104.

In certain embodiments, the user interface 102 may provide multiple dashboards to allow entry of information for different business units of the same parent organization. A user may view a single web page with multiple dashboards corresponding to business units. The user may enter information corresponding to each business unit on the same web page. In this manner, a single database may include information separated into data sets. Each data set may correspond to a business entity or a business unit of a parent business entity.

In one embodiment, system 100 may restrict access to user interface 102 or any other parts of system 100. For example, access to user interface 102 or any other parts of system 100 may be restricted by certain criteria such as, for example, membership or association with particular departments, franchisee, business association, management levels, users, employees, security clearances, priority levels, biometric data, passwords, encrypted keys, smart cards, other suitable groups or criteria, or any combination thereof. In one embodiment, system 100 and user interface 102 may restrict and assign certain read, write, or other capabilities to each authorized user on an individual basis or according to a particular group. For example, a CPA and certain members of his/her firm may be given full read and write capabilities while using user interface 102, while other members are given simply read-only capabilities according to one embodiment of the present disclosure.

Network 104 may provide access to data collected by system 100 and communicate the data or information to user interface 102, database 106, and/or user interface 108 in real-time according to one embodiment of the present disclosure. In one embodiment, network 104 may include any suitable public or private network of computers, Internet, intranet, terminals, servers, databases, applications, programs, software, secured areas, networked devices, cloud network, other suitable devices or modules, or any combination thereof configured to communicate by one or more wire-line or wireless connections.

In one embodiment, network 104 may include any suitable server, user terminal, stand-alone unit, kiosk, network device, database, module, application, software, modem, cellular modem, facsimile machine, backup database, telephone system, router, Internet connection, Intranet connection, Internet portal, Intranet portal, cloud portal, user graphical interface, remote access portal, dedicated network, social media outlet, other suitable device, area, network, outlet, or database, or any combination thereof. It should be understood that network 104 may be any suitable number, size, or configuration according to one embodiment of the present disclosure.

Database 106 may include any suitable data storing or data storing and correlating unit to store, parse, categorize, or perform any other suitable function by using, for example, accounting information, accounting data, accounting rules, general ledger category rules, access rules, checking information, business information, management information, collected data, correlated data, billing information, income information, invoice information, expense information, tax information, payroll information, desired queries, behavioral information, other suitable information, or any combination thereof according to one embodiment of the present disclosure.

In one embodiment, database 106 may accept requests from server 108 for data and then may fulfill the request by querying the data associated with database 106. Any data or files generated by the request, query, inputs of system 100, outputs of system 100, the result of the query, or any other action, may be stored and associated with a cloud thus enabling access of information from anywhere using a web-enabled device according to one embodiment of the present disclosure.

In one embodiment, database 106 may store and correlate information related to checks, invoices, payments, credits, debits, and historical data in data tables or other organizational scheme. Database 106 may also be used to store and aid in correlating data inputs, data outputs, key fields, and historical data that may be used to suggest general ledger codes. For example, database 106 may store and correlate information regarding accounts payable, transaction information, vendor invoices, bank information, back-up bank information, business information, back-up business information, vendor information, back-up vendor information, payroll information, historical data, other suitable data, or any combination thereof. The API of system 100 may be located on server 108 and may be used by user interface 102.

In one embodiment, database 106 may generally include any server, group of servers, databases, cloud databases, memories, applications, software, computer programs, routines, other objects, or any combination thereof. In one embodiment, database 106 is generally configured to receive and process data, network packet data, query requests, and output any data as necessary. Database 106 may include certain subsystems or otherwise be associated with a parser, a query engine, a retrieval engine, data manager, file processor, and/or an application-programming interface (API) that may communicate with each other with the aid of dedicated network connections, wire-line connections, wireless connections, other suitable communication links, or any combination thereof.

In one embodiment, system 100 and database 106 provide a backup process by which current tables of data are copied and saved in backup files. For example, if new data is received by system 100 or database 106, system 100 checks to see if the backup ID associated with that data is zero. If it is zero, then the information with the new data is copied from the current table to a backup table and updated. If it is not zero (i.e., the information is already in the backup table), system 100 or database 106 does not update the backup table. Accordingly, system 100 or database 106 recognizes whether a table needs updating and does not unnecessarily waste time or resources updating backup tables if there is no new information to update.

In one embodiment, database 106 may include or be a part of any storage media, cloud database, memories, user terminal, stand-alone unit, network device, database, module, application, software, modem, cellular modem, facsimile machine, backup database, telephone system, router, Internet connection, Intranet connection, Internet portal, Intranet portal, user graphical interface, remote access portal, other suitable device, area, or database, or any combination thereof. It should be understood that any suitable number, size, or configuration of database 106 may be used according to one embodiment of the present disclosure.

Server 108 may include any suitable server, application server, group of servers, processors, databases, memories, applications, software, computer programs, routines, other objects, or any combinations thereof according to one embodiment of the present disclosure. For example, server 108 may include a web server or open source web server suitable for RIA environments such as, for example, an Apache web server. In one embodiment, database 106 may include a database server or open source database server such as, for example, a MySQL database system.

Figure 2:
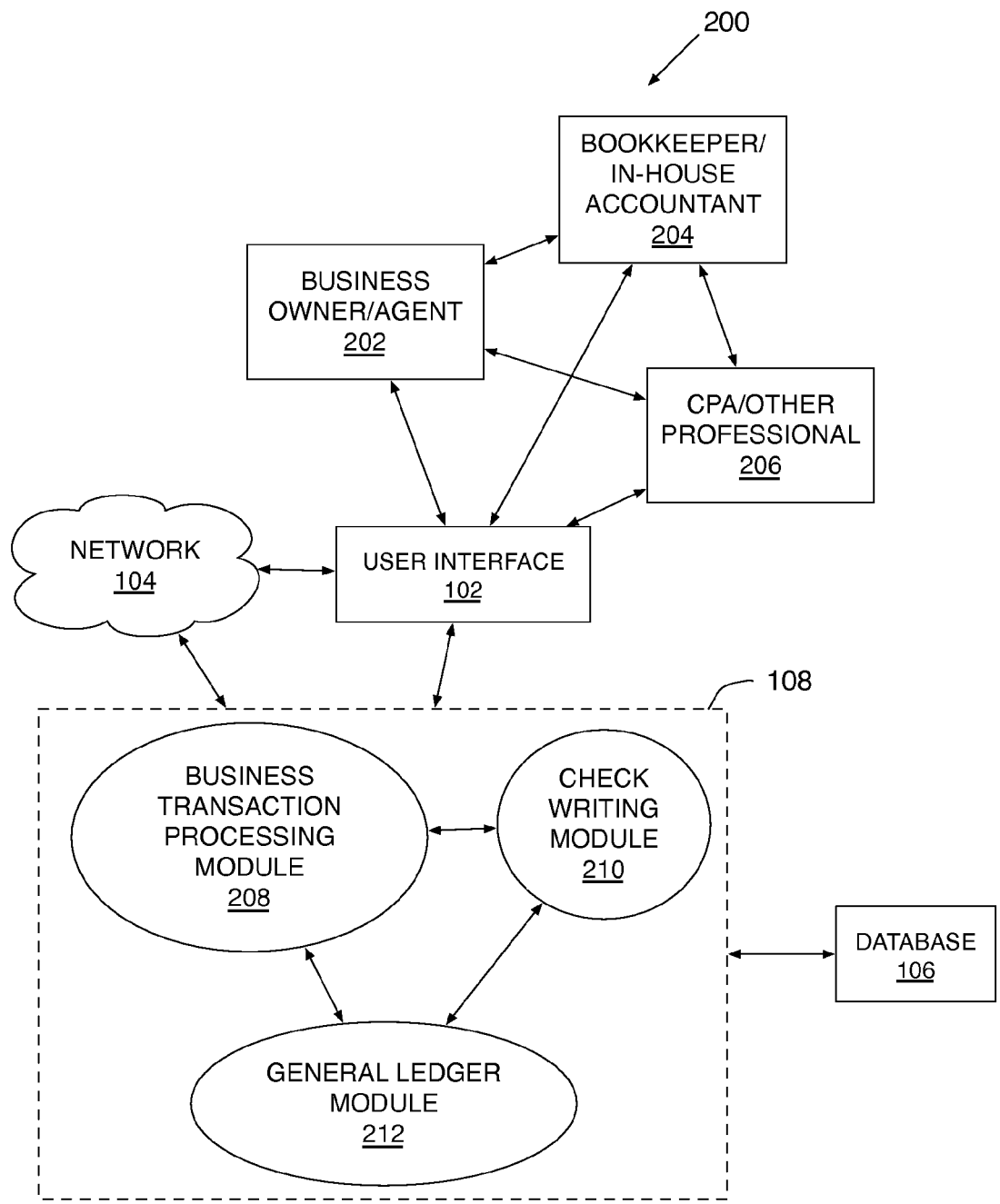
FIG. 2 is a simplified illustration of exemplary subsystems associated with the system shown in FIG. 1 according to one embodiment of the present disclosure.

FIG. 2 is a simplified illustration of exemplary subsystem 200 associated with system 100 shown in FIG. 1 according to one embodiment of the present disclosure. It should be understood that subsystems 200 shown in FIG. 2 are for illustrative purposes only and that any other suitable system or subsystem may be used in conjunction with or in lieu of subsystems 200 or its subsystems according to one embodiment of the present disclosure.

Subsystem 200 may be accessed by any suitable user using, for example, user interface 102, network 104, database 106, and/or server 108 as described herein according to one embodiment of the present disclosure. In one embodiment, any authorized persons may use subsystem 200 including, for example, business owner/agent 202, bookkeeper/in-house accountant 204, and/or certified public accountant (CPA)/other professional 206 (collectively referred to herein as a user or users).

Server 108 may generally include business transaction processing module 208, check-writing module 210, and general ledger module 212 according to one embodiment of the present disclosure. Although server 108 in FIG. 2 is illustrated as including business transaction processing module 208, check-writing module 210, and general ledger module 212, it should be understood that each module may be located remotely from the other modules or located remotely from server 108. The illustrated embodiment of server 108 shows the check-writing module 210. However, in certain embodiments of the present disclosure, the server 108 may not include the check-writing module 210. Thus, the server 108 may function according to the teachings of the present disclosure with or without the check-writing module 210.

Business transaction processing module 208 may be used by business owner/agent 202 to process invoicing, billing, debits, credits, taxes, financial information, bank information, credit cards, vendor information, and other related information for account receivable and check-writing purposes according to one embodiment of the present disclosure.

Business transaction processing module 208 may process a variety of business transactions such as, for example, cash, incoming cash, outgoing cash, non-cash, or accrual transactions. For example, transactions involving the receipt of cash payments may be processed by module 208. Cash receipt transactions may be business transactions where the business receives cash through sales of business assets. Module 208 may also process cash receipt transactions involving receiving cash through a loan or equity funding. In certain financial businesses, cash receipt transaction may involve receiving cash deposits from customers. The business transaction processing module 208 may process the above listed cash receipt transactions, and the like, in accordance with proper accounting principles. In this manner, the business owner may employ the teachings of the present disclosure to process cash receipt business transactions without having the immediate accounting knowledge to properly record the transaction consistent with accounting principles. The subsystem 200 may allow accounting associated with a particular transaction to be performed by an accounting professional at a later time.

The business transaction processing module 208 may also process non-cash transaction that may occur in connection with a business. For example, the business transaction processing module 208 may process any suitable accrual transactions such as, for example, any transaction that creates an asset, liability, income, expense, or equity. For example, with respect to an income transaction, the business may invoice a customer or client for products or services performed or to be performed by the business. In accordance with embodiments of the present disclosure, information associated with the invoice may be processed and stored by server 108 and/or database 106 to allow accounting related to the invoice to be performed by an accounting professional at a later time. This may free the business owner to process the transaction with obtaining accounting expertise to record the transaction according to standard accounting principles.

Cash payments may also be processed according to embodiments of the present disclosure. Cash payments may involve cash being paid from the business. For example, cash may or may not be paid through a check transaction. Module 208 may process cash payment transactions including, but not limited to, payment of payroll, payment of bills (accounts payable), payment of taxes, payment of loans, or the business may authorize a direct draw from its bank.

In accordance with an embodiment of the present disclosure, business transaction processing module 208 may receive financial and other information associated with a particular transaction and determine proper tax treatment of the transaction. The user of subsystem 200 may provide the financial information and type of transaction. Thus, the module 208 may determine based on the amount and the type of transaction, the tax liability associated with the particular transaction.

According to embodiments of the present disclosure, a business owner or employee may conduct a transaction, such as making a payroll payment at a desired time, and the accounting procedures, including associating the transaction with a general ledger code, may be performed at a later time by a separate individual with more accounting expertise.

In connection with cash transactions that involve issuing a check, subsystem 200 may employ check-writing module 210 to assist a business owner in providing the proper information and issuing a check. For example, check-writing module 210 may prompt business owner 202 or bookkeeper 204 to enter an amount, date, check memo, invoice number, vendor name, and other information and correlate the information with any documents supporting the checks, receipts, invoices, purchasing order, account information, or other documents according to one embodiment of the present disclosure. In one embodiment, check-writing module 210 may track the sequence of check numbers or allow business owner/agent 202 to input a check number.

In one embodiment, check-writing module 210 may print checks on blank checking paper and avoid using pre-printed checks. Check-writing module 210 may also store an image of the resulting check according to one embodiment of the present disclosure. In addition, any incoming paper or electronic checks may be analyzed using optical character recognition (OCR) or other related technology to analyze checks for memo information, short description, check-writer information, bank information, or other information. Such information may be stored in database 106 and processed by application server 108. The scanned image may be stored or otherwise associated with any invoices or other documents for reference or review at a later time according to one embodiment of the present disclosure. In one embodiment, application server 108 may parse or disseminate information and determine one or more suggested general ledger codes for the checking transaction.

In one embodiment, check-writing module 210 may also store and analyze an image of any incoming paper or electronic checks. In addition, any incoming checks may be analyzed using OCR or other related technology for vendor name, payment amount, memo information, short description, check-writer information, bank information, or other information. The scanned or electronic version may be stored or otherwise associated with any invoices or other documents for reference or review at a later time according to one embodiment of the present disclosure. In one embodiment, such information may be stored in database 106 and processed by application server 108. Check-writing module 210 may aid system 100 in determining suggested general ledger codes for the checking transaction according to one embodiment of the present disclosure.

Although check-writing module 210 is described herein as primarily storing and analyzing checks, it should be understood that check-writing module 210 may be used to store and analyze any paper, document, electronic receipt, invoice, bill, deposit slip, statement, tax report, payroll information, other suitable document, or any combination thereof and determine one or more suggested general ledger codes for such document or transaction according to one embodiment of the present disclosure.

General ledger module 212 may be used by bookkeeper 204 (or in-house accountant) and certified public accountant (CPA) 206 (or other professional) to quickly review information, accept or change general ledger codes to correspond to each entry according to one embodiment of the present disclosure. In one embodiment, general ledger module 212 may be used by bookkeeper 204 or CPA 206 to code or otherwise review the information from business transaction processing module 208 and any checks created or received by check-writing module 210.

In one embodiment, general ledger module 212 may receive and analyze information from business transaction processing module 208 and provide the system 100 and subsystem 200 the ability to analyze key fields, compare general ledger code (or classification) with that of similar businesses or databases and to output a suggested general ledger code accordingly.

Figure 3:
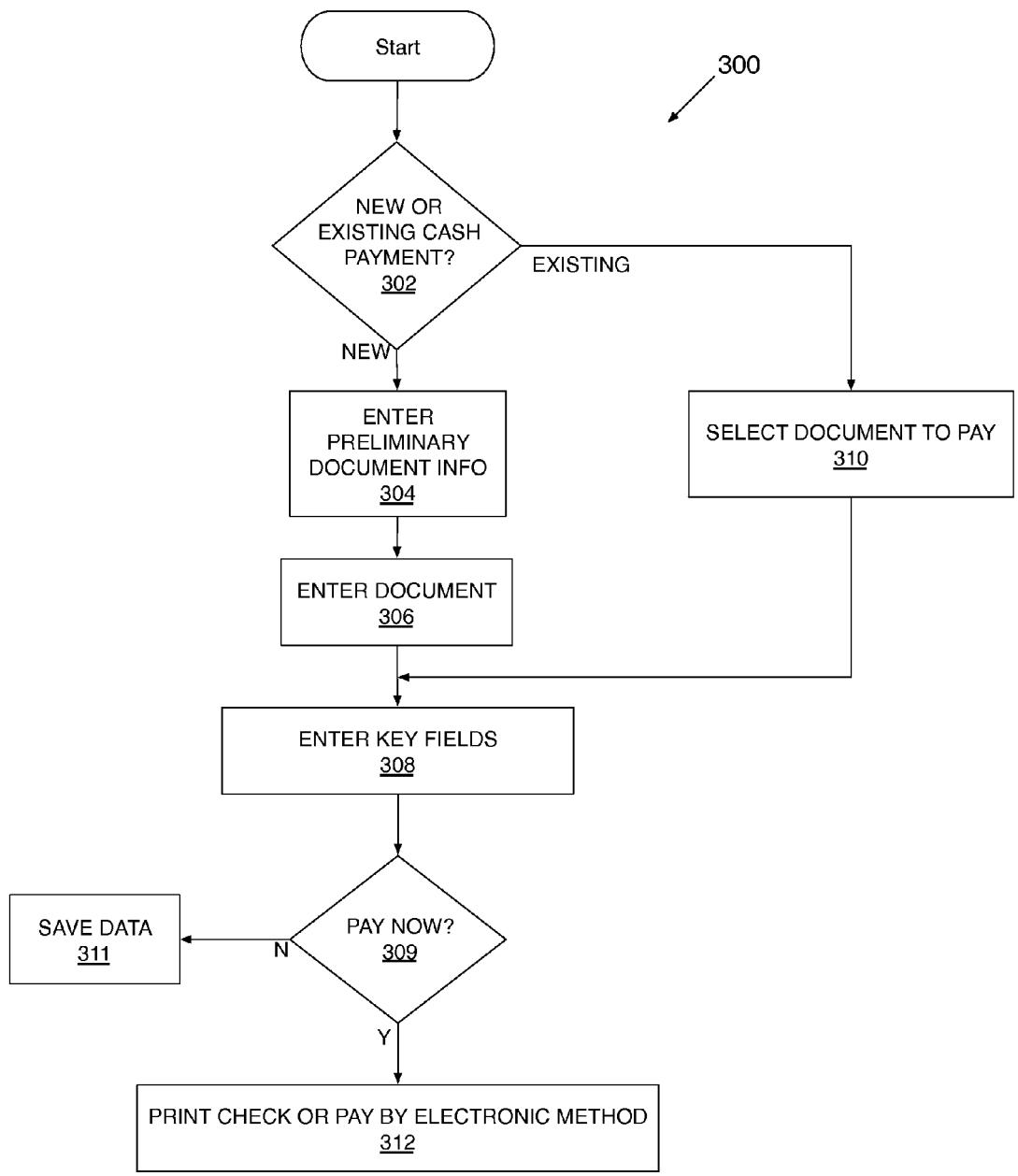
FIG. 3 is an exemplary method of processing a cash payment transaction using the system shown in FIG. 1 according to one embodiment of the present disclosure.

FIG. 3 illustrates an exemplary method 300 of processing cash payment transactions using system 100 shown in FIG. 1 according to one embodiment of the present disclosure. It should be understood that method 300 shown in FIG. 3 is for illustrative purposes only and that any other suitable method or sub-method may be used in conjunction with or in lieu of method 300 or its sub-methods according to one embodiment of the present disclosure. It should also be understood that the steps included in method 300 either in its entirety, any individual step, series of steps, or set of steps may be repeated, performed in any suitable order, or simultaneously performed according to one embodiment of the present disclosure.

Method 300 may be used to process a new cash payment transaction (e.g., a new incoming invoice) or an existing payment transaction (e.g., an invoice already logged in system 100) according to one embodiment of the present disclosure. In one embodiment, method 300 may provide a system or process of, for example, entering a new transaction in system 100, processing a payment for an existing transaction already present in system 100, or processing a payment for a new transaction using system 100.

In step 302, a user may determine whether a particular transaction includes a new payment transaction (e.g., a new incoming invoice) or existing payment transaction, and this determination may be communicated to the system 100. Cash payment transactions may include, for example, a new bill, invoice, fee statement, or payment request from a customer or vendor. An existing payment transaction may include payroll, tax payment, loan payment, or authorization for direct draw from a bank. An existing payment transaction may also be a bill, invoice, fee statement, or payment request already logged or otherwise entered in system 100.

If in step 302, it is determined that the transaction includes a new cash payment transaction (e.g., a new invoice), method 300 continues with step 304. If the transaction includes an existing cash payment transaction, method 300 continues with step 310.

A user may enter information indicating to the system 100 that system 100 is to receive a document associated with a cash payment transaction at step 304. The user may also enter preliminary information associated with the document in system 100 using, for example, user interface 102 according to one embodiment of the present disclosure. In one embodiment, the preliminary information may include any information associated with the incoming transaction such as, for example, category of transaction, vendor name, invoice number, payment amount requested, transaction dates, due dates, reminder dates, memo information, other transaction related information, or any combination thereof.

At step 306, the document (e.g., an incoming invoice) may be entered by the user and received by the system 100. According to an embodiment of the present disclosure, an electronic document may be received by the system 100 in electronic form. The electronic document may be communicated to the system 100 via email, document exchange, electronically within a particular network, or any other suitable method for transmitting and receiving electronic documents or files. In another embodiment, a hard copy of the document may be scanned by the system 100.

For the scanned document, OCR or other related technology may be used to identify and extract information from the document. For the electronic document, OCR technology may not be necessary to identify and extract pertinent information from the document. Such information may include memo information, short description, check-writer information, bank information, or other information. Such information may be stored in database 106 and processed by application server 108.

The document may be stored or otherwise associated with any invoices or other documents for reference or review at a later time. In one embodiment, application server 108 may parse and/or disseminate information from the document and store one or more suggested general ledger codes for the transaction. At step 308 key fields that were not populated with information extracted from the document may be manually populated with appropriate information.

It should be understood that steps 306 and 308 may be performed in any chronological order depending on the preference of the user, the type of transaction item at issue, and the format of the transaction item according to one embodiment of the present disclosure.

In certain embodiments, the cash payment associated with the document may be paid or set for future payment at step 309. If the cash payment is to be paid, the system 100 may employ check-writing module 210 to process a check that may be printed to be delivered to the payee at step 312. The system 100 may also electronically pay the cash payment transaction by transmitting data electronically to a bank or other financial institution associated with the payee.

System 100 may also store the information associated with the cash payment at step 311. The stored information and the document provided may be linked or otherwise associated with the particular cash payment transaction. This link may facilitate the application of a general ledger code to the cash payment transaction according to general accounting principles. Also, the payment may be made at a later time and may be made in connection with other payments that may not be directly associated with the particular cash payment transaction. This may be particularly beneficial to an organization where one group of the business organization receives the invoice and provides the invoice and the initial information so that a payment may be made in the future. Then, another group of the business organization may retrieve the saved payment information and actually make the payment at a later date.

The above-described association may be maintained for the particular transaction even if it is changed for a subsequent transaction. For example, an account number associated with a particular vendor may change such that the new account number is provided in a subsequent transaction. Even though the new account number may be provided in a subsequent transaction, the original account number may still be associated with the original transaction and may be coded accordingly.

If it is determined that the payment transaction to be processed is an existing payment transaction, the user may indicate that an existing transaction is to be processed at step 302. At step 310, the user may select an existing document or transaction item (e.g., an existing invoice already present on system 100) from a list or table of existing items at step 310. For the selected document, key fields may be populated at step 308, and a check may be printed or an electronic payment may be made as described above at step 312. For example, when an invoice is first received, the preliminary document information may have been entered and the invoice may have been scanned or electronically communicated to the system 100. This information may have been saved for later payment. At a later time, the document to pay may be selected and the key fields may be populated. Then payment may be made according to step 312. In alternate embodiments, after a document is selected at step 310, any of steps 304, 306, 308, 309, or 311 may be performed for the existing cash payment transaction as appropriate.

It should be understood that steps 308 and 310 may be performed in any chronological order depending on the preference of the user, the type of transaction item at issue, and the format of the transaction item according to one embodiment of the present disclosure. For example, if the transaction item was tagged or otherwise associated with a payment or due date, method 300 may automatically print a check or transmit data electronically to a bank or financial institution without a user selecting an existing payment transaction in step 310.

Figure 4:
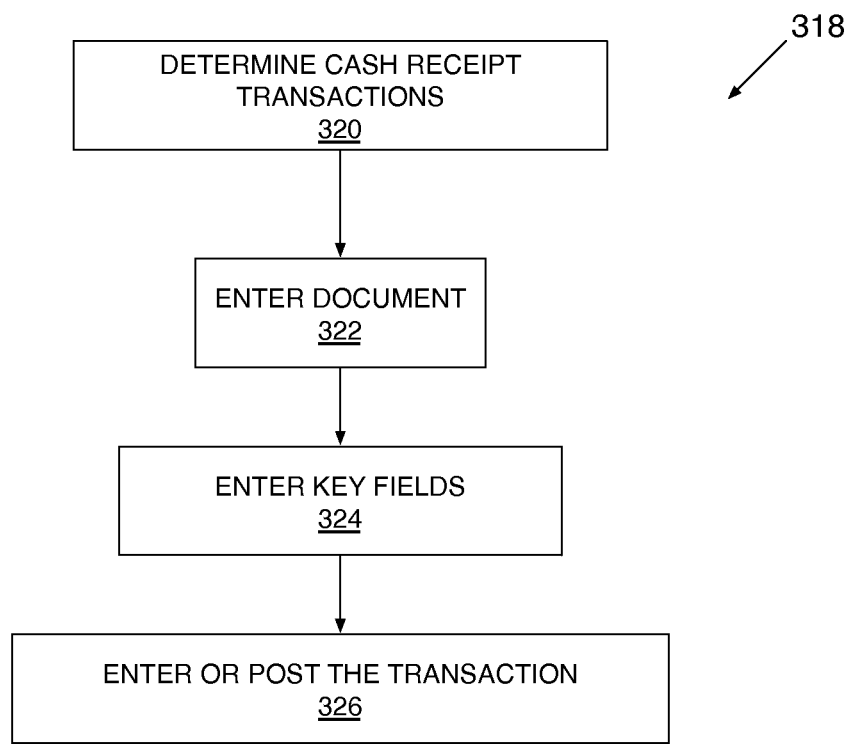
FIG. 4 is an exemplary method of processing a cash receipt transaction using the system shown in FIG. 1 according to one embodiment of the present disclosure.

FIG. 4 illustrates a method 318 for processing cash receipt transactions according to an embodiment of the present disclosure. The steps of method 318 may be similar to the steps of method 300 for paying cash transactions. For example, after determining that the system 100 is to process a cash receipt transaction at step 320, a document associated with the cash receipt transaction may be scanned or otherwise received by system 100 at step 322. The system 100 may receive a document associated with the sale of goods or services of the business or the sale of assets of the business or other types of cash receipt transactions. The document may be processed similar to that described above with respect to the cash payment transactions. For example, key fields not automatically populated from information from the scanned document may be manually entered at step 324. Once the information associated with the cash receipt transaction is received and stored by the system 100, the transaction may be entered or posted at step 326.

Figure 5:
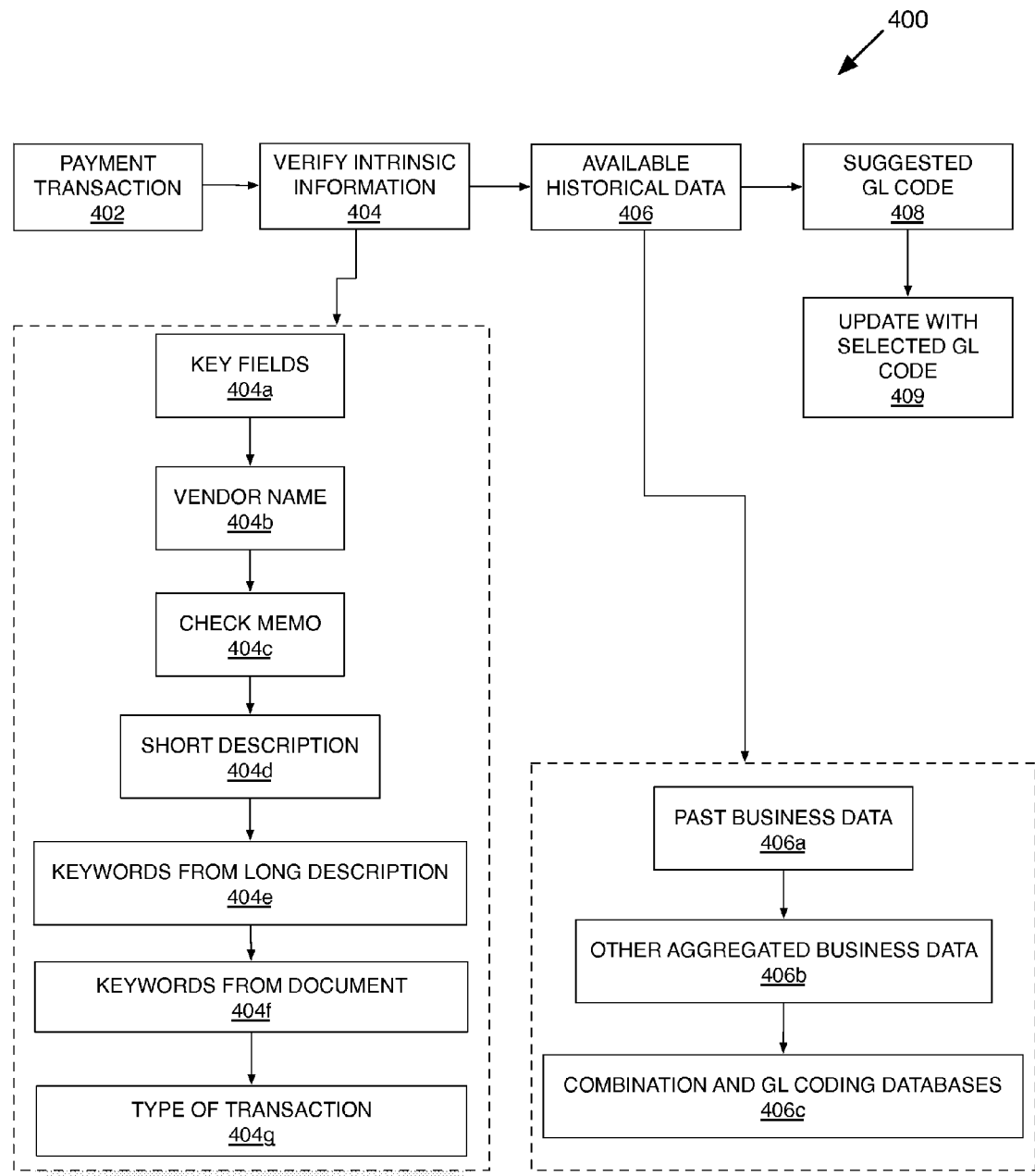
FIG. 5 is an exemplary method of automatically coding cash payments using the system shown in FIG. 1 according to one embodiment of the present disclosure.

FIG. 5 illustrates a method 400 of automatically coding cash payments using system 100 shown in FIG. 1 according to one embodiment of the present disclosure. It should be understood that method 400 shown in FIG. 5 is for illustrative purposes only and that any other suitable method or sub-method may be used in conjunction with or in lieu of method 400 or its sub-methods according to one embodiment of the present disclosure. It should also be understood that the steps included in method 400 either in its entirety, any individual step, series of steps, or set of steps may be repeated, performed in any suitable order, or simultaneously performed according to one embodiment of the present disclosure.

Method 400 may be used to automatically generate and dynamically "learn" general ledger codes associated with cash payment transactions made by or using system 100 according to one embodiment of the present disclosure. In one embodiment, method 400 may provide a system or process of, for example, populating a database with data and information associated with payments and correlating the data to provide suggested general ledger codes for each transaction using, for example, predefined rules, historical data, and user inputted data.

A payment transaction may be received in step 402 using for example, method 300 described above. The payment transaction may be a transaction for an invoice that has been paid according to step 312 of FIG. 3 or an invoice may have been entered and saved for future payment, as described with respect to step 311. For each type of transaction, the method 400 may be used to automatically apply a code to the transaction for accounting purposes, such as a general ledger code.

At step 404, the method may parse, disseminate, check, or verify any intrinsic information related to the payment transaction. In one embodiment, at step 404, the system 100 may parse, disseminate, check, or verify information 404a-404g, such as type of transaction, key fields, vendor name, check memos, short description, keywords from long description, keywords from OCR or electronic version of a document related to the payment transaction that are either stored in database 106 or otherwise associated with the cash payment transaction at issue. It should be understood that any other information relevant to identifying, classifying, or otherwise coding the payment transaction may be included in step 404 according to one embodiment of the present disclosure.

In step 406, method 400 may include correlating any available historical data according to one embodiment of the present disclosure. In one embodiment, step 406 may include steps 406a-406c to parse, disseminate, check, verify, or correlate information such as, for example, past business data, aggregated business data, and combination and general ledger coding databases. In one embodiment, step 406 may also include information related to the present payment transaction, related payment transactions, payments made to same vendor, payments made on a particular date, information related to payments having similar memo information, any other similar historical information, or any combination thereof to aid in classifying the payment transaction with a general ledger code or category of codes in step 408.

In step 408, method 400 suggests a code or category of codes and displays or otherwise outputs the suggested code or group of codes to the user according to one embodiment of the present disclosure. The code may be an alpha, numeric, or alphanumeric series of characters. In certain embodiments, the code may be a general ledger code corresponding to one or more accounts in the general ledger or subsidiary ledger for the business. A business's general ledger may be the main accounting record of a business, which is organized as a set of accounts for the various business transactions of the company. For example, the general ledger may include accounts for such items as current assets, fixed assets, liabilities, revenue and expense items, gains and losses. The general ledger may be supported by one or more subsidiary ledgers that provide details for accounts in the general ledger. For instance, an accounts receivable subsidiary ledger may contain a separate account for each credit customer, tracking that customer's balance separately. According to the teachings of the present disclosure, a general ledger code may be applied to associate a particular business transaction with one or more accounts in the general ledger.

The suggested codes may be prioritized or ranked by method 400 in order of highest probable choice to lowest probable choice. The suggested general ledger code may be accepted or a general ledger code may be selected from the group of codes suggested by method 400 according to one embodiment of the present disclosure.

If the accounting professional or bookkeeper does not accept the suggested general ledger code or the highest ranked suggested general ledger code, then another general ledger code may be suggested or a subsequently ranked general ledger code may be suggested. The system 100 may use information about the unselected and selected general ledger codes to update and change database 106 according to one embodiment of the present disclosure at step 409. For example, the selected general ledger code may be stored by the system 100 and associated with specific information about the particular cash payment transaction. Thus, in a future coding operation for a future business transaction, the system 100 may use the information associated with the general ledger code along with other historical data in its determination of one or more suggested general ledger codes for the future business transaction.

Accordingly, method 400 may dynamically change databases or other parts of system 100 to correlate key fields and historical data and suggest general ledger codes according to one embodiment of the present disclosure. By dynamically changing and creating rules to code payment transactions, method 400 increases the accuracy and efficiency in suggesting such codes and attempts to dynamically "learn" the common payment transactions and general accounting practices of the company or business.

The following is an example of the system 100 determining a general ledger code associated with a particular cash payment transaction. The information and documents associated with the cash payment transaction has previously been received by the system 100 according to the method 300, and from the business owner's perspective, the transaction is substantially complete. The remaining steps involve proper bookkeeping and accounting of the cash payment transaction. The business owner may have previously used system 100 to enter information to cause the system 100 to issue a check to the utility supplier, ABC Electric (Vendor Name 404a), for a security deposit in January 2009 (Check Memo 404c and Short Description 404d). When the check was issued by the system, the business owner may have scanned or entered an electronic version of a contract with ABC Electric (Keywords From Document 404*f*) and associated the scanned contract with the security deposit transaction. The business owner may have also noted that ABC Electric requested a two-month security deposit, but the business only paid a one-month security deposit (Keywords From Long Description 404*e*).

According to an embodiment of the present disclosure, the system 100 may use the information associated with the security deposit transaction to determine a general ledger code for the specific transaction. The system may suggest this general ledger code to an accounting professional, and the accounting professional may accept, reject, or modify the suggested general ledger code for accounting and bookkeeping purposes. For example, the system may analyze the information stored by the system 100 and determine that the word "deposit" appears frequently in the cash transaction information. The system may also determine that historically the word deposit is most often used in connection with the ABC Electric vendor. The system may analyze transactions that have been coded in the past for similarities to the present transaction. The system 100 may then analyze the information associated with the transaction to determine whether the transaction involves, assets, liabilities, business owner's equity, income, or expense.

Based on this analysis, the system may determine that the cash payment transaction to ABC Electric is a security deposit, and it may determine an appropriate general ledger code associated with a security deposit for a utility vendor. This code or a collection of similar codes may be displayed to the accounting professional or bookkeeper. The accounting professional or bookkeeper may then accept, reject, or modify the suggested general ledger code. The accounting professional or bookkeeper may also completely disregard the suggested general ledger code and enter a different one. The general ledger code selected by the accounting professional may be used to update the database 106. Thus, in future coding operations, the selected general ledger code may be considered.

Figure 6:
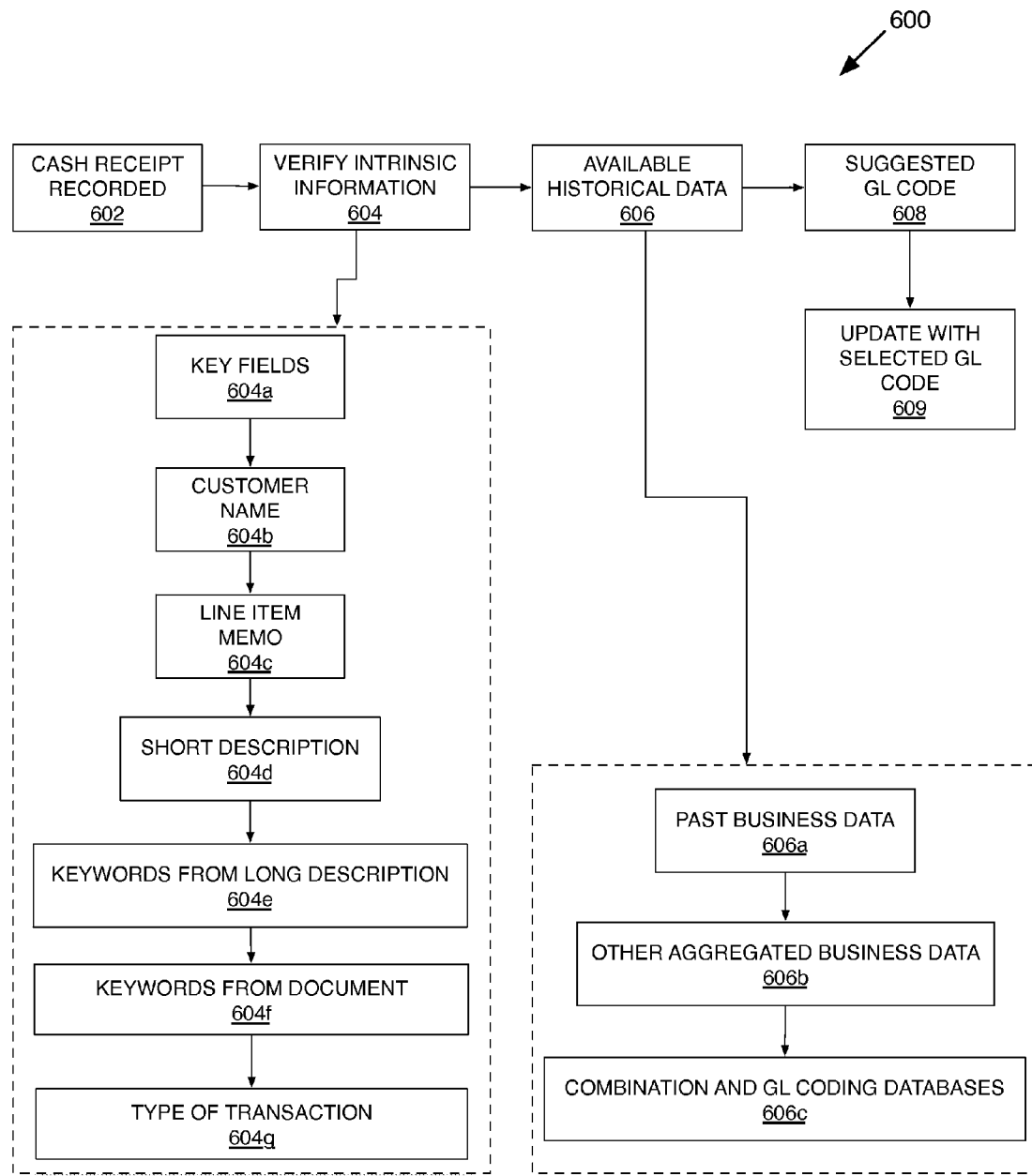
FIG. 6 is an exemplary method of automatically coding cash receipt transactions using the system shown in FIG. 1 according to one embodiment of the present disclosure.

FIG. 6 illustrates method 600 of automatically coding receipt of cash using system 100 shown in FIG. 1 according to one embodiment of the present disclosure. It should be understood that method 600 shown in FIG. 6 is for illustrative purposes only and that any other suitable method or sub-method may be used in conjunction with or in lieu of method 600 or its sub-methods according to one embodiment of the present disclosure. It should also be understood that the steps included in method 600 either in its entirety, any individual step, series of steps, or set of steps may be repeated, performed in any suitable order, or simultaneously performed according to one embodiment of the present disclosure.

Method 600 may be used to automatically generate and dynamically "learn" general ledger codes associated with payment transactions made by or using system 100 according to one embodiment of the present disclosure. In one embodiment, method 600 may provide a system or process of, for example, populating a database with data and information associated with payments and correlating the data to provide suggested general ledger codes for each transaction using, for example, predefined rules, historical data, and user inputted data.

After cash is received, the information associated with the cash receipt may be received and stored by system 100 at step 602. The system 100 may then either parse, disseminate, check, or verify any intrinsic information related to the cash receipt transaction at step 604. For example, at step 604, the system 100 may parse, disseminate, check, or verify information 604*a*-604*g*, such as type of transaction, key fields, customer name, line item memos, short description, keywords from long description, keywords from OCR or electronic version of document related to the cash receipt transaction that are either stored in database 106 or otherwise associated with the payment transaction at issue. It should be understood that any other information relevant to identifying, classifying, or otherwise coding the payment transaction may be included in step 604 according to one embodiment of the present disclosure.

In step 606, method 600 may include correlating any available historical data according to one embodiment of the present disclosure. At step 606, information 606*a*-606*c* may be parsed, disseminated, checked, verified, or correlated. For example, the system 100 may analyze past business data, aggregated business data, and combination and general ledger coding databases. In one embodiment, step 606 may also include information related to the present cash receipt transaction, related cash receipt transactions, transaction involving cash receipt from the same customer, cash received on a particular date, information related to cash receipt having similar line item memo information, any other similar historical information, or any combination thereof to aid in classifying the payment transaction with a general ledger code or category of codes in step 608.

In step 608, method 600 suggests a general ledger code or category of codes and displays or otherwise outputs the suggested general ledger code or group of codes to the accounting professional or bookkeeper. The suggested codes may be prioritized or ranked by method 600 in order of highest probable choice to lowest probable choice. The suggested general ledger code may be accepted, selected, modified, rejected, or a new general ledger code may be entered by the accounting professional or bookkeeper according to one embodiment of the present disclosure.

If the accounting professional or bookkeeper does not accept the suggested general ledger code or the highest ranked suggested general ledger code, then another general ledger code may be suggested or a subsequently ranked general ledger code may be suggested. The system 100 may use information about the unselected and selected general ledger codes to update and change database 106 according to one embodiment of the present disclosure at step 609. For example, the selected general ledger code may be stored by the system 100 and associated with specific information about the particular cash receipt transaction. Thus, in a future coding operation for a future business transaction, the system 100 may use the information associated with the general ledger code along with other historical data in its determination of one or more suggested general ledger codes for the future business transaction.

Accordingly, method 600 may dynamically change databases or other parts of system 100 to correlate key fields and historical data and suggest general ledger codes according to one embodiment of the present disclosure. By dynamically changing and creating rules to code payment transactions, method 600 may increase the accuracy and efficiency in suggesting such codes and attempts to dynamically "learn" the common payment transactions and general accounting practices of the company or business.

The following is an example of the system 100 determining a general ledger code associated with a particular cash receipt transaction. The information and documents associated with the cash receipt transaction may have previously been received by the system 100 according to the method 300, and from the business owner's perspective, the transaction is substantially complete. The remaining steps involve proper bookkeeping and accounting of the cash payment transaction. The business owner may have previously used system 100 to enter information to cause the system 100 to recognize cash receipt from XYZ Limited, a customer of the business (Customer Name 604a), as income for services rendered or products sold in March 2009 (Line Item Memo 604c and Short Description 604d). When the cash receipt was recorded by the system, the business owner may have scanned or otherwise entered an invoice for services rendered or products sold to XYZ Limited (Keywords From Document 604f) and associated the invoice with the particular cash receipt transaction. The business owner may have also noted that XYZ Limited is a customer that paid some of the balance owed and with discount the amount received is good income (Keywords From Long Description 404e). The business owner may have also noted that the cash receipt was a sales transaction that related to the banking of the business (Type of Transaction 404g).

According to an embodiment of the present disclosure, the system 100 may use the information associated with the cash receipt transaction to determine a general ledger code for the specific transaction. The system 100 may suggest this general ledger code to an accounting professional, and the accounting professional may accept, reject, or modify the suggested general ledger code for accounting and bookkeeping purposes.

For example, the system 100 may analyze the information stored by the system 100 and determine that the word "income" appears frequently in the cash receipt transaction information. The system may also determine that historically the word "income" is most often used in connection with the XYZ Limited vendor. The system 100 may analyze transactions that have been coded in the past for similarities to the present transaction. The system 100 may then analyze the information associated with the transaction to determine whether the transaction involves, assets, liabilities, business owner's equity, income, or expense.

Based on this analysis, the system 100 may determine that the cash receipt transaction from XYZ Limited is an income transaction, and it may determine an appropriate general ledger code associated with the particular income transaction for a customer. This code or a collection of similar codes may be displayed to the accounting professional or bookkeeper. The accounting professional or bookkeeper may then accept, reject, or modify the suggested general ledger code. The accounting professional or bookkeeper may also completely disregard the suggested general ledger code and enter a different one. If the suggested general ledger code is modified, the system 100 may store this change in the database 106 to assist it in suggesting general ledger codes in similar future transactions. The general ledger code selected by the accounting professional may be used to update the database 106. Thus, in future coding operations, the selected general ledger code may be considered.

Similar to the cash receipt and cash payment transaction described above, the system 100 may also allow accounting and bookkeeping to be performed for non-cash transactions, such as an invoice transaction, according to the teachings of the present disclosure. For an invoice transaction, the user may enter information associated with a payment owed to the business. The user may also enter an invoice that has been previously created or the system may create an invoice for the user. Regardless of whether an invoice is created by the system or an existing invoice is entered by the user, the system may suggest one or more general ledger codes according to the teachings of the present disclosure that may be associated with the noncash invoice transaction. For example, the system may suggest a general ledger code associated with a debit for a particular accounts receivable account and may also suggest a credit associated with a particular income account. Once the invoice is paid, the system and methods for processing a cash receipt transaction described herein may be employed to process and classify the payment.

Accordingly, the present disclosure generally provides integrated systems and methods of bookkeeping, payment transactions, and automatic general ledger coding and management having a user interface, network, database, and server. Each data entry may be associated with multiple documents supporting the entry, thus eliminating the need to save/store the documents in a physical file according to one embodiment of the present disclosure. In one embodiment, the system and method may include a check-writing module to automatically print checks and a processor to automatically generate and dynamically "learn" general ledger codes associated with payment transactions and historical data and thus provide an accountant the ability to review all financial information cost-effectively and efficiently.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method in a data processing system of classifying a financial transaction, comprising:
   receiving transaction information associated with a financial transaction from a user;
   receiving a source document associated with the financial transaction;
   storing the transaction information and source data associated with the source document in a database;
   retrieving the stored transaction information and the source data from the database;
   determining a code associated with the financial transaction based on the retrieved transaction information and the retrieved source data;
   providing the determined code as a suggested code to a user;
   receiving a selection or rejection of the suggested code for the financial transaction by the user, wherein the selection comprises the user selecting the suggested code for the financial transaction, wherein the rejection comprises the user rejecting the suggested code for the financial transaction, and wherein a response to the rejection comprises one of providing an alternate suggested code to the user or receiving a manually inputted code from the user; and
   updating the database to reflect the received user selection or rejection information of the suggested code for the financial transaction, wherein the received user selection or rejection information of the suggested code is usable in determining and providing suggested codes for subsequent transaction information received, and wherein the method steps are performed by a processor in the data processing system.

2. The method of claim 1, wherein the code comprises a general ledger code.

3. The method of claim 2, wherein the financial transaction is a cash payment transaction and the source document is an invoice.

4. The method of claim 3, further comprising creating a check based on the transaction information and the invoice.

5. The method of claim 3, further comprising making an electronic payment based on the transaction information and the invoice.

6. The method of claim 2, wherein:
the transaction information comprises a payee; and
determining the general ledger code is further based on historical financial transaction data in the database associated with the payee.

7. The method of claim 2, wherein:
the transaction information comprises a keyword; and
determining the general ledger code is further based on historical financial transaction data in the database associated with the keyword.

8. A data processing system for classifying a financial transaction, comprising:
a processor; and
a database in data communication with the processor, wherein the processor is programmed to:
receive transaction information associated with a financial transaction from a user;
receive a source document associated with the financial transaction;
store the transaction information and source data associated with the source document in the database;
retrieve the stored transaction information and the source data from the database;
determine a code associated with the financial transaction based on the retrieved transaction information and the retrieved source data;
provide the determined code as a suggested code to a user;
receive a selection or rejection of the suggested code for the financial transaction by the user, wherein the selection comprises the user selecting the suggested code for the financial transaction, wherein the rejection comprises the user rejecting the suggested code for the financial transaction, and wherein a response to the rejection comprises one of providing an alternate suggested code to the user or receiving a manually inputted code from the user; and
update the database to reflect the received user selection or rejection information of the suggested code for the financial transaction,
wherein the received user selection or rejection information of the suggested code is usable in determining and providing suggested codes for subsequent transaction information received.

9. The system of claim 8, wherein the code comprises a general ledger code.

10. The system of claim 9, wherein the financial transaction is a cash payment transaction and the source document is an invoice.

11. The system of claim 10, wherein the processor is further operable to create a check based on transaction information and the invoice.

12. The system of claim 10, wherein the processor is further operable to make an electronic payment based on the transaction information and the invoice.

13. The system of claim 9, wherein:
the transaction information comprises a payee; and
the processor determines the general ledger code based on historical financial transaction data in the database associated with the payee.

14. The system of claim 9, wherein:
the transaction information comprises a keyword; and
the processor determines the general ledger code based on historical financial transaction data in the database associated with the keyword.

15. A non-transitory computer-readable storage medium with an executable program stored thereon, wherein the program instructs a processor to perform operations comprising:
receiving transaction information associated with a financial transaction from a user, the transaction information comprising a keyword;
receiving a source document associated with the financial transaction;
storing the transaction information and source data associated with the source document in a database;
retrieving the stored transaction information and the source data from the database;
determining a general ledger code associated with the financial transaction based on the retrieved transaction information, the retrieved source data, and historical financial transaction data in the database associated with the keyword;
providing the determined general ledger code as a suggested general ledger code to a user;
receiving a selection or rejection of the suggested general ledger code for the financial transaction by the user, wherein the selection comprises the user selecting the suggested code for the financial transaction, wherein the rejection comprises the user rejecting the suggested code for the financial transaction, and wherein a response to the rejection comprises one of providing an alternate suggested code to the user or receiving a manually inputted code from the user; and
updating the database to reflect the received user selection or rejection information of the suggested general ledger code for the financial transaction,
wherein the received user selection or rejection information of the suggested general ledger code is usable in determining and providing suggested codes for subsequent transaction information received.

16. The non-transitory computer-readable storage medium of claim 15, wherein the financial transaction is a cash payment transaction and the source document is an invoice; and
the program further instructs the processor to create a check based on the transaction information and the invoice.

17. The non-transitory computer-readable storage medium of claim 15, wherein the financial transaction is a cash payment transaction and the source document is an invoice; and
the program further instructs the processor to make an electronic payment based on the transaction information and the invoice.

18. The method of claim 1, wherein determining a code comprises determining a plurality of codes associated with the financial transaction based on the retrieved transaction information and the retrieved source data; and
wherein providing the determined plurality of codes as suggested codes to the user comprises providing the plurality of codes as a prioritized list.

19. The method of claim 18, wherein the prioritized list is ranked in order of highest probable code to lowest probable code.

20. The method of claim 1, wherein responsive to receiving a selection or rejection of the suggested code for the financial transaction by the user further comprises:
- responsive to receiving user selection of the suggested code, associating the selected code with the financial transaction;
- responsive to receiving user rejection of the suggested code, providing an alternate suggested code to the user for selection or rejection, and
- responsive to receiving user rejection of the suggested code with a manually inputted code from the user, associating the manually inputted code with the financial transaction.

* * * * *